United States Patent
Shimada et al.

(10) Patent No.: US 9,140,581 B2
(45) Date of Patent: Sep. 22, 2015

(54) POSITION DETECTOR

(75) Inventors: Taishi Shimada, Aichi (JP); Yasukazu Hayashi, Aichi (JP)

(73) Assignee: Okuma Corporation (JP)

( * ) Notice: Subject to any disclaimer, the term of this patent is extended or adjusted under 35 U.S.C. 154(b) by 358 days.

(21) Appl. No.: 13/190,087

(22) Filed: Jul. 25, 2011

(65) Prior Publication Data

US 2012/0029868 A1 Feb. 2, 2012

(30) Foreign Application Priority Data

Jul. 29, 2010 (JP) ................................. 2010-170840

(51) Int. Cl.
| G01C 9/00 | (2006.01) |
| G01D 5/245 | (2006.01) |
| G01D 5/244 | (2006.01) |

(52) U.S. Cl.
CPC ............ G01D 5/2451 (2013.01); G01D 5/2448 (2013.01)

(58) Field of Classification Search
CPC .......................... G01D 5/2448; G01D 5/2451
USPC ........................................ 702/150, 157, 94
See application file for complete search history.

(56) References Cited

U.S. PATENT DOCUMENTS

| 7,064,914 B1 * | 6/2006 | Erden et al. ..................... 360/31 |
| 7,109,900 B2 * | 9/2006 | Kiriyama et al. ............. 341/115 |
| 2003/0030816 A1 * | 2/2003 | Eom et al. ..................... 356/486 |
| 2005/0067996 A1 * | 3/2005 | Eba ................................ 318/609 |
| 2005/0283300 A1 | 12/2005 | Teulings et al. |
| 2006/0076480 A1 * | 4/2006 | Kiriyama et al. ........ 250/231.16 |
| 2007/0093980 A1 | 4/2007 | Stek et al. |
| 2008/0228423 A1 * | 9/2008 | Hayashi .......................... 702/94 |
| 2010/0066347 A1 | 3/2010 | Nakamura et al. |

FOREIGN PATENT DOCUMENTS

| CN | 1882822 | 12/2006 |
| CN | 1989393 | 6/2007 |
| CN | 101147041 | 3/2008 |
| CN | 101676680 | 3/2010 |
| JP | 2008232649 | 10/2008 |
| WO | WO 2006/092026 A1 | 9/2006 |

* cited by examiner

*Primary Examiner* — Michael Nghiem
*Assistant Examiner* — Eman Alkafawi
(74) *Attorney, Agent, or Firm* — McCarter & English, LLP

(57) ABSTRACT

A position detector includes detection coils for outputting two sinusoidal signals that have phases shifted from each other by 90 degrees; subtractors for eliminating offset components included in output signals DCA and DSC output from the detection coils; an interpolation calculator for converting the two signals DCA and DSC in which the offset components have been eliminated into position information IP; a radius calculator for calculating a root-sum-square of the two signals DC and DS output from the detection coils; correlation calculators for respectively multiplying a fluctuation component RDA of an output from the radius calculator by the signals DCA and DSC in which the offset components have been eliminated; low-pass filters (LPFs) for extracting DC components of output values output from the correlation calculators; and an outputter for outputting offset components including offset displacement fractions based on output values COMDC and SOMDC output from the LPFs.

3 Claims, 4 Drawing Sheets

POSITION DETECTOR

CROSS-REFERENCE TO RELATED APPLICATIONS

This application claims priority to Japanese Patent Application No. 2010-170840, filed on Jul. 29, 2010, which is incorporated herein by reference in its entirety.

TECHNICAL FIELD

The present invention relates to a position detector that converts, into position information, output signals output from a position sensor which outputs two signals that vary sinusoidally with respect to a measured displacement and have phases shifted from each other by 90 degrees.

RELATED ART

Position detectors for detecting a position based on output signals output from a position sensor which outputs two signals that vary sinusoidally in accordance with a displacement of a measurement target and have phases shifted by 90 degrees have been heretofore known. In such devices, offset components included in the output signals output from the position sensor are obtained using a radius calculator that calculates a root-sum-square of the two signals to automatically eliminate the offset components so that the output signals are converted into high-accuracy position information. Position detectors of this type are disclosed in, for example, JP 2008-232649 A.

FIG. 4 is a diagram illustrating the device disclosed in JP 2008-232649 A. In FIG. 4, devices and the like which are not necessary for describing the present invention are not shown. A rotor 1 shown in FIG. 4 is composed of a magnetic member having 36 depressions and projections on its outer periphery in one rotation at the pitch of wavelength $\lambda=10$ degrees, and is attached to a rotation shaft. When the rotation shaft is rotated, change in reluctance caused by the depressions and projections on the rotor outer periphery causes a cosine analog signal AC and a sine analog signal AS of a rotational displacement $\theta/36$ to be generated in two detection coils 2 and 3. These signals are respectively converted by A/D converters 4 and 5 into digital signals DC and DS. At the time when power is turned on, offset components measured at the time of manufacture of the position detector are stored in memory units 6 and 7. Subtractors 8 and 9 output signals DCA and DSC in which offset components included in the digital signals DC and DS are eliminated. An interpolation calculator 12 performs an arctangent calculation using two variables, the signals DCA and DSC, as inputs. As a result, the signals DCA and DSC are converted into a position signal IP representing an amount of rotation within a $1/36^{th}$ rotation of the rotation shaft.

After power is turned on, the signals DCA and DSC in which offset components are eliminated are subjected to a calculation according to the following equation (1) by a radius calculator 10, and a radius value RD is output from the radius calculator 10.

$$RD = SQRT(DCA^2 + DSC^2) \quad (1)$$

where SQRT represents a square root, and ^2 represents a square.

Every time the rotational position is changed by $\lambda$, a Fourier analyzer (FFT) 11 performs a Fourier analysis based on an interpolation value IP output from the interpolation calculator 12 and a value corresponding to a radius value RD for each positional change by $\lambda/2^n$ (n is an integer greater than or equal to 3). Then, a cosine component C1 and a sine component S1, which are first-order components obtained as a result of the Fourier analysis, and offset components CO and SO stored in the memory units 6 and 7 are respectively added by adders 13 and 14. As a result, at times when a storage command signal SET output from the Fourier analyzer 11 is input to the memory units 6 and 7, the offset components CO and SO stored in the memory units 6 and 7 are updated as occasion arises. As the principles based on which the first-order components obtained as a result of the Fourier analysis correspond to amounts of offset displacement are described in JP 2008-232649 A, the description is not repeated here.

According to the method of calculating offset components based on a radius value RD described in JP 2008-232649 A, in order to perform a Fourier analysis, a value corresponding to a radius value RD for each positional change by $\frac{1}{2^n}$ within the pitch of the wavelength $\lambda$ must be calculated. As a result, there is a problem in that, at a speed at which the position changes by $\lambda/2^n$ or greater per AD sample period, because it is impossible to perform a Fourier analysis, it is impossible to extract offset components.

The present invention was made in view of the circumstances as described above, and an object of the present invention is to identify, even during high-speed rotation, offset components that degrade interpolation accuracy which are included in two signals that vary sinusoidally in accordance with a displacement of a measurement target and have phases shifted from each other by 90 degrees, to thereby improve interpolation accuracy. It is also an object of the present invention to thereby simultaneously achieve both high accuracy and high speed in a position detector.

SUMMARY

According to one aspect of the present invention, there is provided a position detector for outputting position information in accordance with a displacement of a measurement target, comprising a position sensor for outputting two signals that vary sinusoidally in accordance with the displacement of the measurement target and have phases shifted from each other by 90 degrees; an offset component eliminator for eliminating, from the output signals output from the position sensor, offset components included in the output signals; an interpolation calculator for converting two signals in which the offset components have been eliminated into position information; a radius calculator for calculating a root-sum-square of either the two signals output from the position sensor or the two signals in which the offset components have been eliminated; a correlation calculator for respectively multiplying a fluctuation component of an output from the radius calculator by the two signals output from the position sensor; a DC component extractor for extracting a DC component of an output value output from the correlation calculator; and an outputter for outputting offset components including offset displacement fractions based on an output value output from the DC component extractor.

According to a preferred aspect of the present invention, the position detector further comprises a speed converter for differentiating the position information output from the interpolation calculator to convert the position information into a speed signal; and an offset memory for storing the offset components, wherein the DC component extractor is composed of a low-pass filter which uses an output from the correlation calculator as an input, and the offset memory stores the offset components including the offset displacement fractions as new offset components when the speed signal has a value greater than a predefined threshold value.

According to another preferred aspect of the present invention, in the position detector, when it is assumed that an amount of movement for which the output signals output from the position sensor change by one cycle is λ, the DC component extractor uses, as inputs, output values output from the correlation calculator each time the position information changes by λ/m (m represents an integer greater than or equal to 2), and extracts a DC component based on an average value of m output values output from the correlation calculator and input in a period of time during which the position information moves by λ.

According to another preferred aspect of the present invention, in the position detector, the correlation calculator comprises a low-pass filter for outputting a DC component of an output value output from the radius calculator; and a subtractor for eliminating, from the output value output from the radius calculator, the DC component output from the low-pass filter, wherein an output from the subtractor is input to the correlation calculator as the fluctuation component of the output from the radius calculator.

By employing the present invention, components corresponding to offset components can be extracted through correlation calculations of an output from the radius calculator and two signals from the position sensor, even without using Fourier transform. Therefore, it is possible to accurately identify offsets as in the technique described in JP 2008-232649 A. Also, even at a rotational speed at which the position changes by $\lambda/2^n$ or greater per sample period of the A/D converter, it is possible to accurately identify offsets. Therefore, even during high-speed rotation, it is possible to precisely identify changes in offsets over time, to eliminate accuracy-degrading components, and to significantly improve the interpolation accuracy. As a result, both high accuracy and high speed can be simultaneously achieved in a position detector.

DETAILED DESCRIPTION (First Embodiment)

Figure 1:
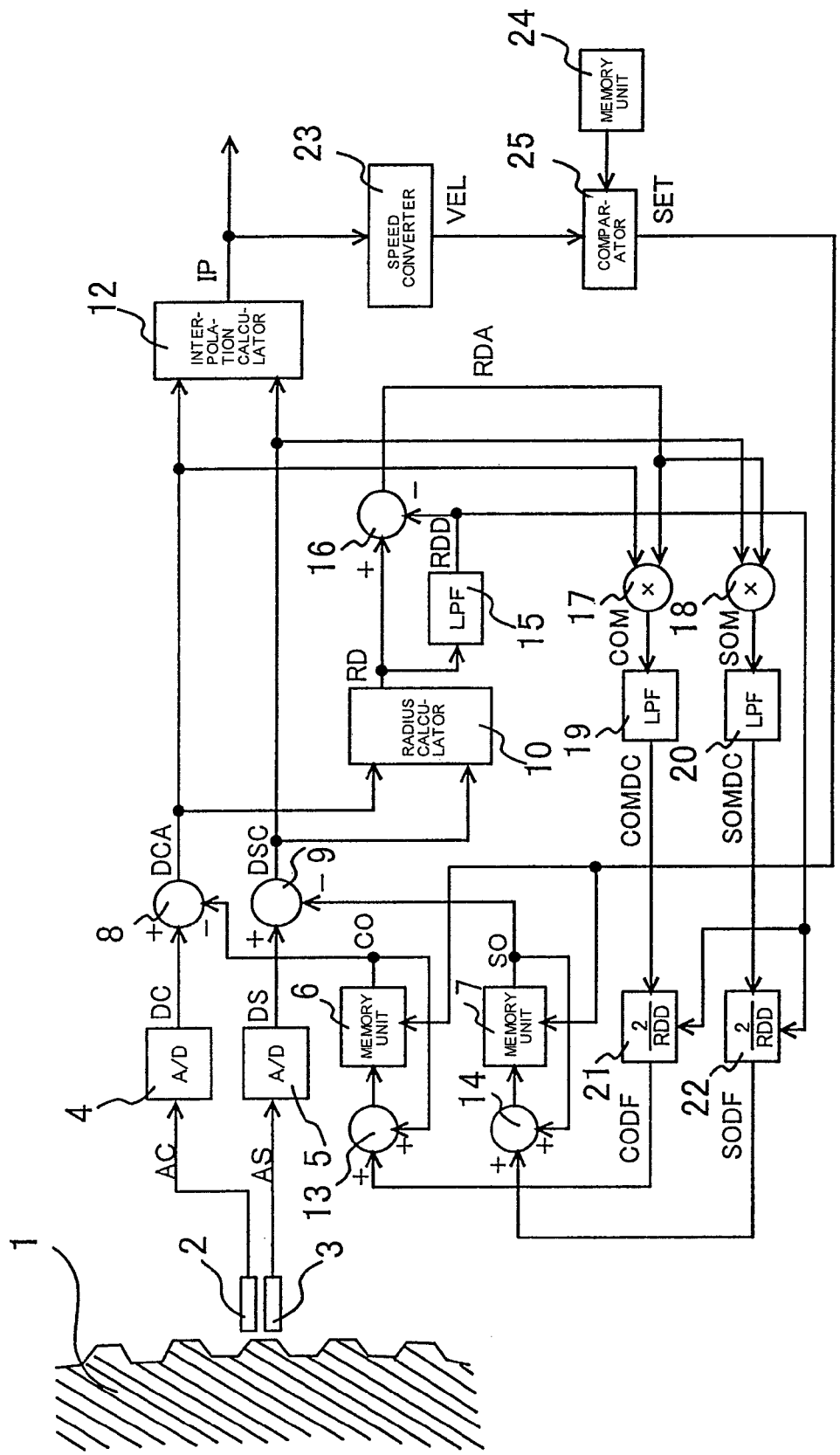
FIG. 1 is a block diagram showing a position detector according to a first embodiment of the present invention.
Figure 4:
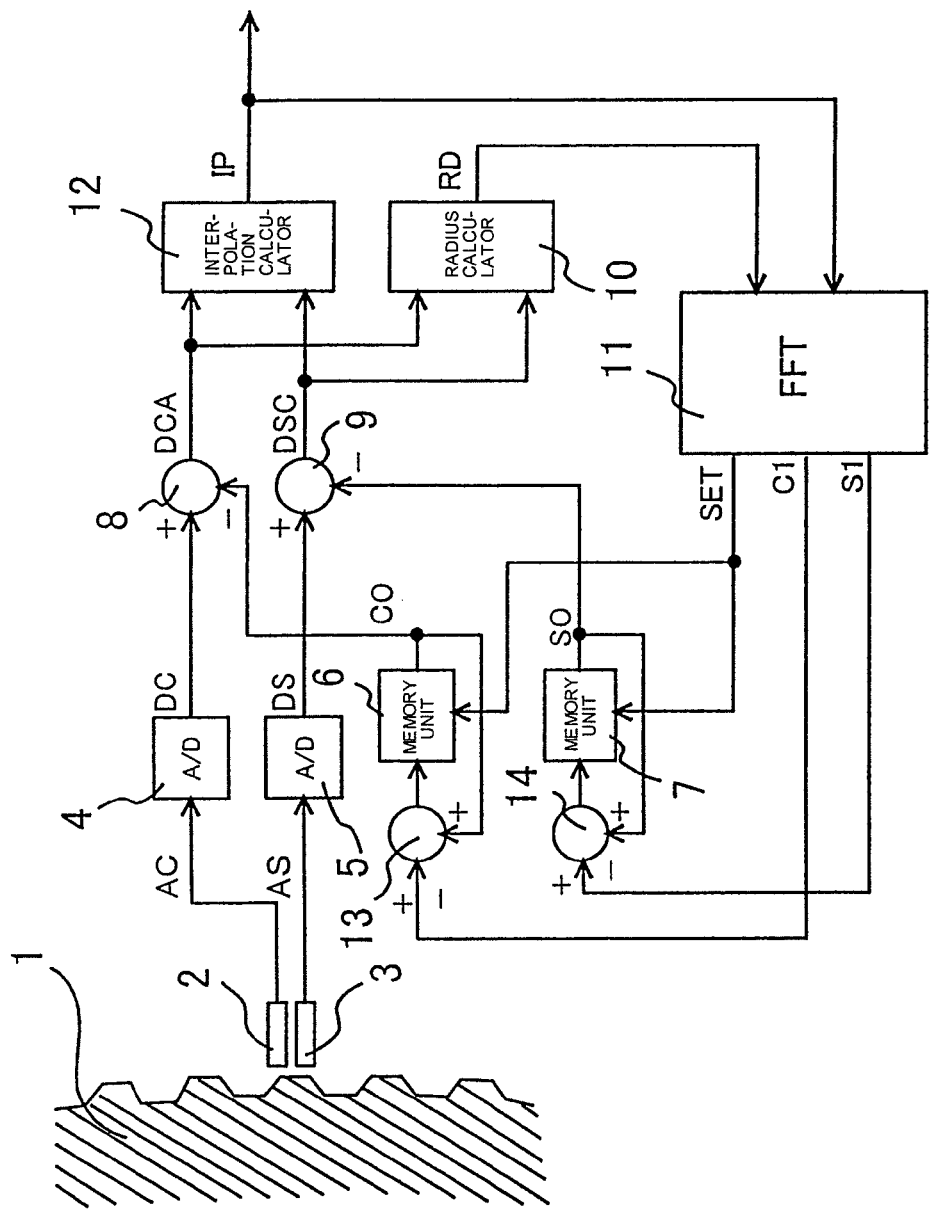
FIG. 4 is a block diagram showing a structure of a related-art position detector.

A first embodiment of the present invention will be described below with reference to the drawings. FIG. 1 is a block diagram showing a structure of a position detector according to the first embodiment of the present invention. In FIG. 1, elements having the same functions as those shown in FIG. 4 are denoted by the same reference numerals, and their description is not repeated.

As shown in FIG. 1, analog signals AC and AS output from two types of detection coils 2 and 3 are converted by A/D converters 4 and 5 into digital signals DC and DS. Signals DCA and DSC obtained by subtracting offset components CO and SO measured at the time of manufacture from the digital signals DC and DS using subtractors 8 and 9 are input to a radius calculator 10. The radius calculator performs a calculation according to the equation (1) to output a radius value RD.

The radius value RD output from the radius calculator 10 is input to a low-pass filter (LPF) 15, and a signal RDD which is a DC component of the radius value RD is output. Then, the signal RDD is subtracted from the radius RD by a subtractor 16, and a signal RDA which is a fluctuation component of the radius RD is output. Multipliers 17 and 18 perform correlation calculations in which the signal RDA is respectively multiplied by the signals DCA and DSC which are obtained by eliminating the offset components CO and SO from the digital signals DC and DS to output signals COM and SOM.

The signals COM and SOM are input to low-pass filters (LPFs) 19 and 20 serving as DC component extractors, and DC components COMDC and SOMDC of the signals COM and SOM are output. At a rotational speed at which the varying frequencies of the position sensor output signals AC and AS are sufficiently higher than the cutoff frequencies of the low-pass filters 19 and 20, the signals COMDC and SOMDC correspond to DC components of the signals COM and SOM. Further, because the signals COMDC and SOMDC are proportional to amplitude components of the signals DCA and DSC, calculators 21 and 22 divide the signals COMDC and SOMDC by the radius DC component RDD which is equivalent to the amplitude components of the signals DCA and DSC, and multiply the results by 2 to thereby output offset displacement fractions CODF and SODF included in the signals DCA and DSC.

Adders 13 and 14 add the signals CO and SO for eliminating the offset components of the signals DC and DS stored by memory units 6 and 7 to the offset displacement fractions CODF and SODF output from the calculators 21 and 22. Then, offset components including the offset displacement fractions output from the adders 13 and 14 are set in the memory units 6 and 7. By setting the offset components in this manner, appropriate offset components are obtained at a rotational speed at which the varying frequencies of the position sensor output signals AC and AS are sufficiently higher than the cutoff frequencies of the low-pass filters 19 and 20.

On the other hand, at a rotational speed at which the varying frequencies of the position sensor output signals AC and AS are lower than the cutoff frequencies of the low-pass filters 19 and 20, it is not possible for the low-pass filters 19 and 20 to extract DC components. It is therefore necessary to suspend setting of offsets during low-speed rotation. For this purpose, a speed converter 23 outputs a speed signal VEL through a differential calculation of an interpolation value IP output by an interpolation calculator 12. A comparator 25 compares the speed signal VEL with a set speed stored in a memory unit 24, and, when the speed signal VEL is a speed greater than the set speed, the comparator 25 outputs a storage command signal SET. When the storage command signal SET is input to the memory units 6 and 7, the offset components including the offset displacement fractions output from the adders 13 and 14 are set in the memory units 6 and 7. On the other hand, when the storage command signal SET is not input, the memory units 6 and 7 do not perform the setting of the offset components including the offset displacement fractions. As a result, the offset components CO and SO are updated only when the rotational speed is sufficiently higher than the cutoff frequencies of the low-pass filters 19 and 20.

(Second Embodiment)

Figure 2:
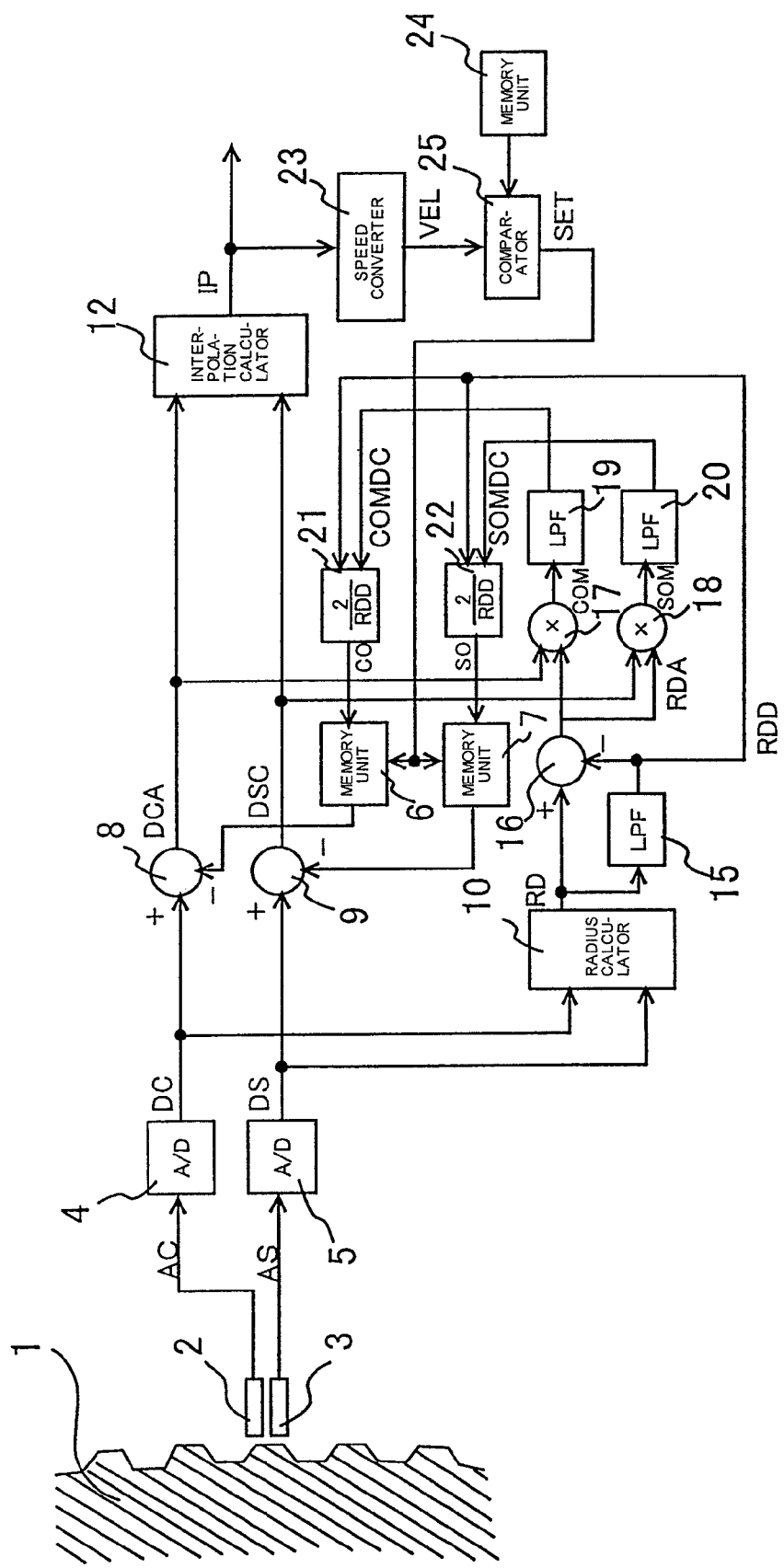
FIG. 2 is a block diagram showing a position detector according to a second embodiment of the present invention.

Next, a second embodiment will be described. FIG. 2 is a diagram showing a structure of a position detector according to the second embodiment. Although, in the first embodiment, the signals DCA and DSC in which offset components have been eliminated are used as inputs to the radius calculator 10, the signals DC and DS in which offset components have not been eliminated are used as inputs to the radius calculator 10 in the present embodiment, as shown in FIG. 2. In this case, because values output from the calculators 21 and 22 are offset components CO and SO of the signals DC and DS, adders 13 and 14 as shown in FIG. 1 are unnecessary. However, in this structure, there is a possibility that, when offset components included in the position sensor output signals are large, the offset identification accuracy may decrease.

(Third Embodiment)

Figure 3:
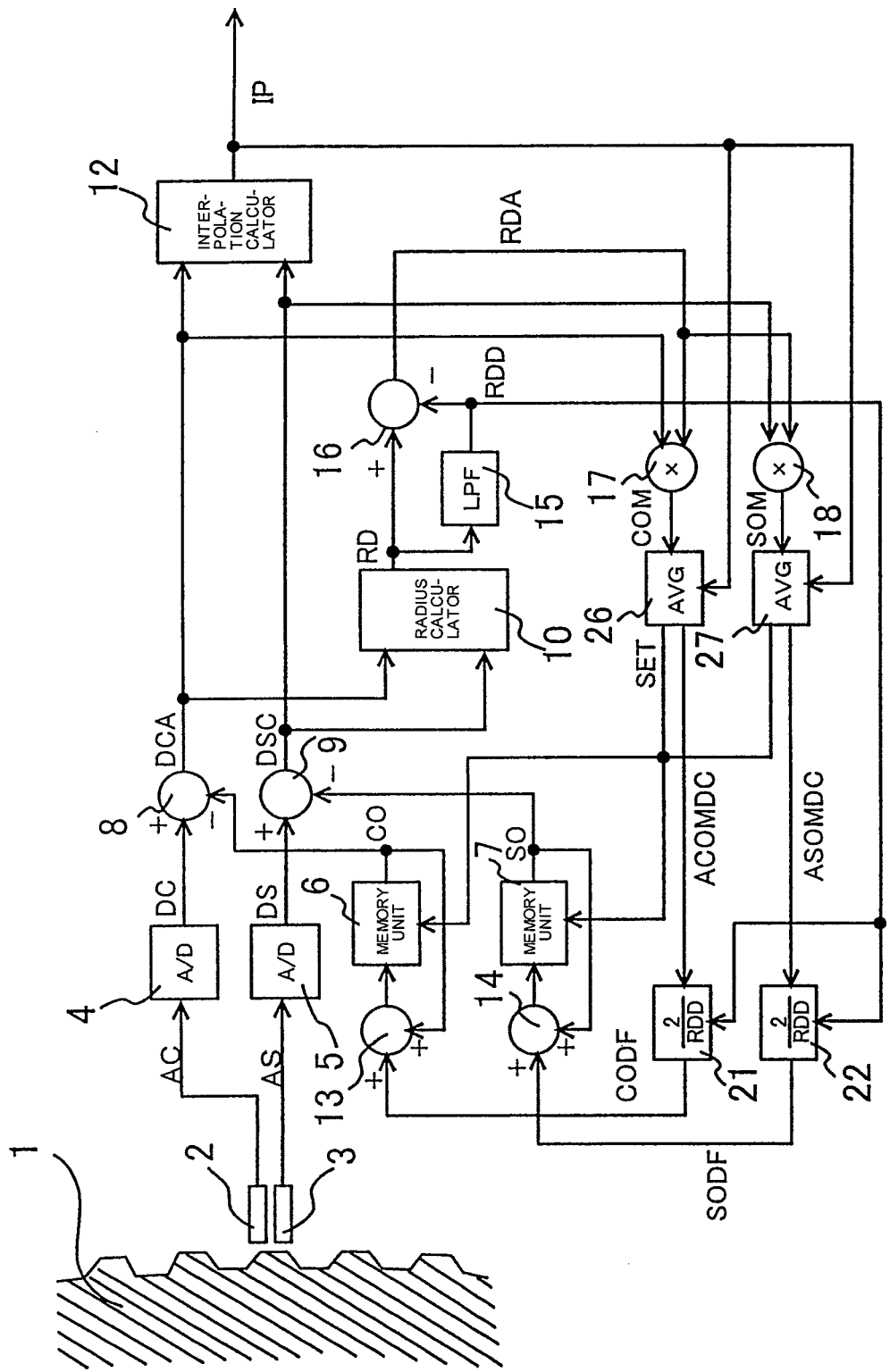
FIG. 3 is a block diagram showing a position detector according to a third embodiment of the present invention.

Next, a third embodiment will be described. FIG. 3 is a diagram showing a structure of a position detector according to the third embodiment. Although, in the first embodiment, the low-pass filters 19 and 20 are used as means for extracting DC components of the signals COM and SOM output from the multipliers 17 and 18, average values for a period of time during which the position sensor output signals change by one cycle are extracted as DC components in the third embodiment, as shown in FIG. 3.

More specifically, averaging processors 26 and 27 output signals ACOMDC and ASOMDC obtained by averaging m values for the signals COM and SOM output from the multipliers 17 and 18 each time an interpolation value IP output from the interpolation calculator 12 changes by $\lambda/m$ ($\lambda$ represents an amount of movement for one pitch of the rotor 1, and m represents an integer greater than or equal to 2). The signals ACOMDC and ASOMDC are DC components of the signals COM and SOM. The calculators 21 and 22 perform calculations similar to those performed in the first embodiment using the signals ACOMDC and ASOMDC as inputs to output offset displacement fractions CODF and SODF included in the signals DCA and DSC.

Further, when the amount of movement of the interpolation value IP is $\lambda$, the averaging processors 26 and 27 output a storage command signal SET, and the offset components CO and SO stored in the memory units 6 and 7 are updated as occasion arises, on principles similar to those of the first embodiment.

As is clear from the foregoing description, by employing a structure according to one of the above-described three embodiments, it is possible to accurately identify offset components of the signals DC and DS to eliminate the offset components from the signals DC and DS. It should be noted that although in the above description the low-pass filter 15 is used in order to eliminate a DC component of the radius RD to extract a fluctuation component, it is also possible to measure a DC component of the radius value, and cause a non-volatile memory to store the value beforehand at the time of manufacture of the position detector to extract a fluctuation component of the radius value RD using the subtractor 16. Further, it is also possible to combine either the first embodiment or the second embodiment with the third embodiment to identify offset components while switching between using the third embodiment during low-speed operation and using either the first embodiment or the second embodiment during high-speed operation.

What is claimed is:

1. A position detector for outputting position information in accordance with a displacement of a measurement target, comprising:
    a position sensor for outputting two signals that vary sinusoidally in accordance with the displacement of the measurement target and have phases shifted from each other by 90 degrees;
    an offset component eliminator for eliminating, from the output signals output from the position sensor, offset components included in the output signals;
    an interpolation calculator for converting two signals in which the offset components have been eliminated into position information;
    a radius calculator for calculating a radius of a root-sum-square of either the two signals output from the position sensor or the two signals in which the offset components have been eliminated;
    a fluctuation component calculator configured for outputting a fluctuation component of the radius, wherein the fluctuation component is determined by inputting the radius value from the radius calculator to a low pass filter to generate an output signal that is a DC component of the radius value, and subtracting the output signal from the low pass filter from the radius value to generate a signal which is a fluctuation component of the radius;
    a correlation calculator for respectively multiplying the fluctuation component output from the fluctuation component calculator by the two signals output from the position sensor in which the offset components have been eliminated;
    a DC component extractor for extracting a DC component of an output value output from the correlation calculator; and
    an outputter for outputting offset components including offset displacement fractions based on an output value output from the DC component extractor, wherein the output components from the outputter are used to determine the position of a rotating target.

2. The position detector according to claim 1, further comprising:
    a speed converter for differentiating the position information output from the interpolation calculator to convert the position information into a speed signal; and
    an offset memory for storing the offset components,
    wherein the DC component extractor is composed of a low-pass filter which uses an output from the correlation calculator as an input, and the offset memory stores the offset components including the offset displacement fractions as new offset components when the speed signal has a value greater than a predefined threshold value.

3. The position detector according to claim 1, wherein when it is assumed that an amount of movement for which the output signals output from the position sensor change by one cycle is $\lambda$, the DC component extractor uses the output values from the correlation calculator as inputs each time the position information changes by $\lambda/m$, wherein in represents an integer greater than or equal to 2, and extracts the DC component of the output values based on an average value of m output values output from the correlation calculator and input in a period of time during which the position information moves by $\lambda$.

* * * * *